DISPLAY DEVICES

Filed March 4, 1965

INVENTOR
DAVID GEORGE SMITH
By Shoemaker and Mattare
ATTYS.

United States Patent Office 3,387,396

Patented June 11, 1968

1

3,387,396
DISPLAY DEVICES

David George Smith, London, England, assignor to Crestworth Limited, London, England Filed Mar. 4, 1965, Ser. No. 437,218
Claims priority, application Great Britain, Mar. 18, 1964, 11,555/64
4 Claims. (Cl. 40—106.21)

ABSTRACT OF THE DISCLOSURE

A display device comprising a container having two substances therein, with one of the substances being of a heavier specific gravity and immiscible with the other substance, with the first substance being of such a nature that it is either substantially solid at room temperature or is so viscous at room temperature that neither will emulsify with the other liquid, and when heat is applied to the container, the first substance will become flowable and move about in the other substance.

The invention relates to display devices wherein a globule or globules of one liquid is suspended in another liquid and the application of heat to a transparent or translucent container for these liquids gives rise to display properties, namely, it causes the globule or globules to ascend and circulate in the container and produce shapes and/or patterns which are fascinating and relaxing to observe, particularly if the device is illuminated and if at least one of the liquids is coloured.

One aspect of the invention concerns the liquids that are used in the container. The liquid in which the globule is suspended is usually dyed water, but not necessarily so. The other liquid is chosen with very many considerations in mind, including the relative densities of the liquids at the desired operating temperature of the device and at room temperature; the fact that the liquids must be immiscible; the fact that the surface tension must be such that the globule does not adhere to the walls of the container; the material of the container; the relative coefficients of thermal expansion of the liquids; and the shapes that are to be obtained during operation. A suitable liquid for the globule has been found to comprise mineral oil, paraffin and a dye when it is intended to suspend it in water, for example, Ondina 17 with a light paraffin, carbon tetrachloride and a dye or dyes. However, undue shaking or sharp impacts, especially during transport of the display device, can cause total or partial emulsification of the globule.

According to the invention, one of the liquids has a melting point above room temperature or so viscous at room temperature that emulsification cannot take place at room temperature. Preferably, the said one liquid is such that the display properties of the device are attained at about 45°–50°. C.

In one form of the invention, the one liquid includes an additive in the form of a thickening or gelling agent which is soluble in said one liquid and causes it to have an increased viscosity or to gel at room temperature, i.e. when the heat source is turned off. At the operating temperature when the heat source is on, say 45°–50° C., the liquid becomes fluent so that the device may then carry out its proper function. An example of a gelling agent for globules of the aforementioned mineral oil composition is a wax, such as paraffin wax, or petroleum jelly.

According to another aspect of the invention, it is attempted to make the open-topped container for the liquids leakproof by providing a seal or stopper comprising upper and lower relatively moveable members and a sealing ring such as an O-ring, the upper member being adapted to fit into the mouth of the container and rest

2 on the edge thereof and having a frusto-conical surface on which the sealing ring can be located, and the lower member carrying an annular projection of substantially the same diameter as the sealing ring, the arrangement being such that, when the stopper is located in the mouth of the container and the lower member is moved towards the upper member, the annular projection causes the sealing ring to be compressed between the frusto-conical surface and the wall at the mouth of the container.

An example of a display device according to the invention is illustrated in the accompanying drawings, wherein.

Figures 1, 2:
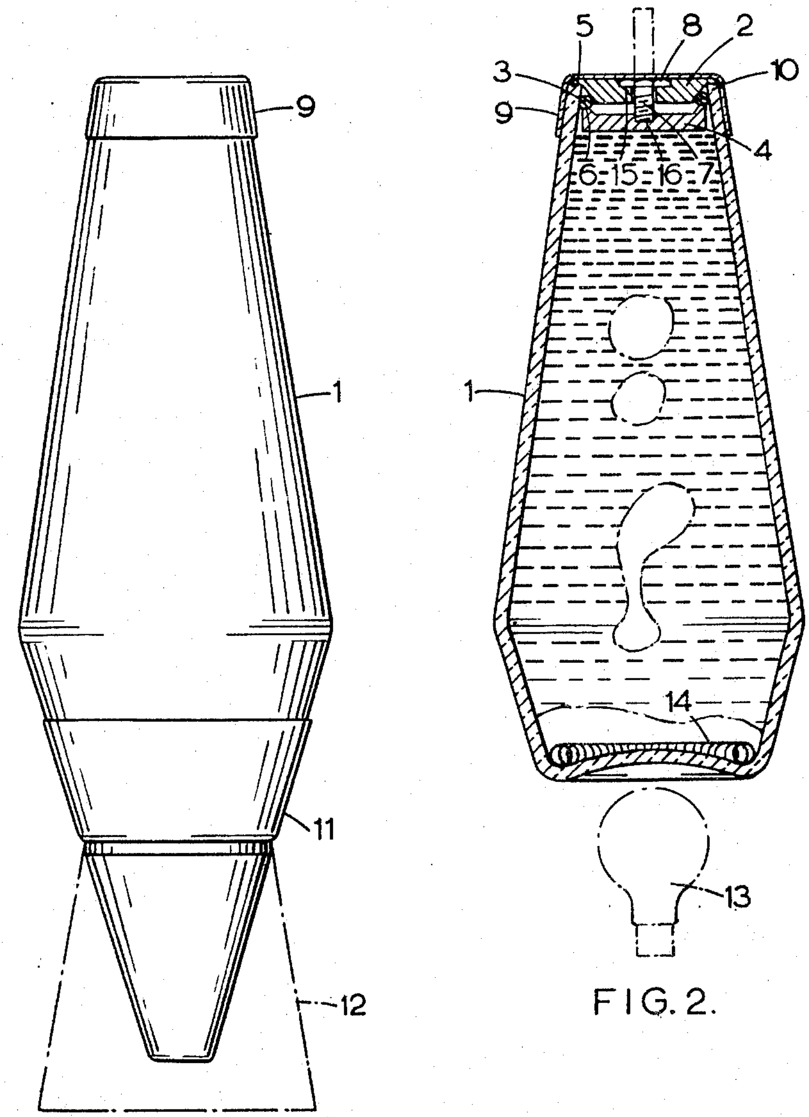
FIG. 1 is a side elevation.
FIG. 2 is a sectional side elevation.

An open-topped glass container 1 contains a stopper comprising a metal plug 2, which is formed with a peripheral flange 5 for resting on the glass edge at the mouth 10 of the container and a conical surface receiving a resilient O-ring 3. A disc 4 carrying an annular projection 6 of substantially the same diameter as the O-ring is secured to the plug 2 by a screw threaded stud 7 and a nut 8, the nut being received in a recess 15 in the plug 2 and the stud passing freely through the plug but being engaged in a screw threaded blind hole 16 in the disc 4.

Into the container, there are placed dyed water and a solidified globule of mineral oil, paraffin and a dye as well as paraffin wax or petroleum jelly, preferably Ondina 17 with a light paraffin, carbon tetrachloride, a dye and the paraffin wax or petroleum jelly.

After the contents have been introduced, the container is sealed as follows. The disc 4 suspended from the plug 2 by the stud 7 and nut 8 is moved upwardly by tightening the nut, until the projection 6 has considerably compressed the ring 3 between the plug 2 and the container wall. The excess length of stud (as indicated in chain dotted lines) is then cut off and a decorative cap 9 is applied to the container.

The container 1 rests in a hollow conical metal seating 11 which, in turn, may be supported in any suitable stand, such as the frusto-conical hollow metallic stand shown at 12 in chain dotted lines. The seating 11 accommodates and may act as a reflector for an electric bulb 13 of suitable wattage for the capacity of the container. The bulb not only illuminates the device from underneath the container but also causes heat to be applied slowly so as to avoid excessive convection currents in the liquids. A suitable operating temperature at which the globule will be fluent is 45° to 50° C. The position of the bulb may be adjustable.

The illustrated shape of the container has been found particularly advantageous in avoiding shadows and in the proper functioning of the device but modifications can be made.

To counteract any tendency of the globule to rise in the form of unattractive small bubbles rather than columnar or mushroom like larger shapes, a surface tension breaker in the form of the illustrated spiral wire ring 14 or a ring of spikes rests on the base of the container 1. This causes any descending small bubbles to re-unite each time they reach the base of the container.

I claim:

1. A display device comprising a container having at least two substances, one substance being a liquid, the second substance being a paraffin base solid at room temperature and immiscible with the liquid, wherein the solid upon being heated will become flowable and move about in the liquid giving rise to display properties, the display device being in the form of a lamp and heating means is mounted beneath the container, and a surface tension breaker comprising a spiral wire ring is mounted within the container at the base thereof.

2. A display device according to claim 1 wherein the solid will become flowable at a temperature of about 40°–50° C.

3. A display device according to claim 1 wherein the solid is paraffin and mineral oil and the liquid is water and one of the substances contains a dye.

4. A display device according to claim 1 wherein the device includes a base, with the container being supported on the base and an electric light bulb in the base, the light bulb supplying the heat to cause the second substance to become flowable.

References Cited

UNITED STATES PATENTS

| | | | |
|---|---|---|---|
| 303,558 | 8/1884 | Campbell | 215—54 |
| 456,257 | 7/1891 | Haigh | 215—54 |
| 700,043 | 5/1902 | Heard | 215—54 |
| 1,856,098 | 5/1932 | Green | 40—106.21 |

FOREIGN PATENTS

| | | |
|---|---|---|
| 703,924 | 2/1954 | Great Britain. |

LAWRENCE CHARLES, *Primary Examiner.*